United States Patent
La Malfa et al.

(10) Patent No.: US 8,844,023 B2
(45) Date of Patent: Sep. 23, 2014

(54) PASSWORD PROTECTED BUILT-IN TEST MODE FOR MEMORIES

(75) Inventors: Antonino La Malfa, Catania (IT); Marco Messina, Augusta (IT)

(73) Assignee: Micron Technology, Inc., Boise, ID (US)

(*) Notice: Subject to any disclaimer, the term of this patent is extended or adjusted under 35 U.S.C. 154(b) by 713 days.

(21) Appl. No.: 12/326,165

(22) Filed: Dec. 2, 2008

(65) Prior Publication Data

US 2010/0138915 A1 Jun. 3, 2010

(51) Int. Cl.
| | |
|---|---|
| *G06F 7/04* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/00* | (2013.01) |
| *G06F 11/00* | (2006.01) |
| *G01R 31/28* | (2006.01) |
| *G11C 7/24* | (2006.01) |
| *G06F 21/74* | (2013.01) |
| *G06F 21/62* | (2013.01) |
| *H04L 9/32* | (2006.01) |
| *G06F 21/79* | (2013.01) |
| *G11C 29/46* | (2006.01) |

(52) U.S. Cl.
CPC *G06F 21/79* (2013.01); *G11C 7/24* (2013.01); *G06F 21/74* (2013.01); *G06F 21/6209* (2013.01); *G06F 12/1433* (2013.01); *H04L 9/3226* (2013.01); *G11C 29/46* (2013.01)

USPC ............ 726/19; 711/164; 713/183; 714/703; 714/742

(58) Field of Classification Search
CPC ......... G06F 21/00; G06F 21/62; G06F 12/14; G06F 21/79; G06F 21/6209; G06F 12/1433; G06F 21/74; H04L 63/083; H04L 9/3226; G11C 29/46; G11C 7/24
USPC .......................................................... 726/19
See application file for complete search history.

(56) References Cited

U.S. PATENT DOCUMENTS

| | | | | |
|---|---|---|---|---|
| 4,310,720 | A * | 1/1982 | Check, Jr. ..................... | 713/155 |
| 4,882,752 | A * | 11/1989 | Lindman et al. .............. | 713/166 |
| 5,210,571 | A * | 5/1993 | Peloquin et al. ............... | 399/11 |
| 5,388,156 | A * | 2/1995 | Blackledge et al. ............ | 726/19 |
| 5,506,396 | A * | 4/1996 | Asami .......................... | 235/492 |
| 5,719,387 | A * | 2/1998 | Fujioka ......................... | 235/492 |
| 6,085,337 | A * | 7/2000 | Mattheis et al. ................ | 714/30 |
| 6,094,724 | A * | 7/2000 | Benhammou et al. ......... | 726/20 |
| 6,401,198 | B1 * | 6/2002 | Harmer et al. ................... | 713/1 |
| 6,681,304 | B1 * | 1/2004 | Vogt et al. .................... | 711/164 |
| 6,731,536 | B1 * | 5/2004 | McClain et al. .......... | 365/185.04 |
| 6,892,322 | B1 * | 5/2005 | Snyder .......................... | 714/30 |
| 7,099,906 | B2 * | 8/2006 | Messina et al. ............... | 708/255 |
| 7,395,434 | B2 * | 7/2008 | Piwonka et al. .............. | 713/183 |
| 7,441,169 | B2 * | 10/2008 | Maeno .......................... | 714/726 |
| 7,519,873 | B2 * | 4/2009 | Shin et al. .................... | 714/703 |
| 7,702,984 | B1 * | 4/2010 | Lee et al. ...................... | 714/742 |

(Continued)

*Primary Examiner* — Carolyn B Kosowski
(74) *Attorney, Agent, or Firm* — Dorsey & Whitney LLP

(57) ABSTRACT

A semiconductor memory may be provided with a built-in test mode that is accessible through a password protection scheme. This enables access to a built-in test mode after manufacturing, if desired. At the same time, the password protection prevents use of the built-in test mode to bypass security features of the memory.

9 Claims, 2 Drawing Sheets

(56) References Cited

U.S. PATENT DOCUMENTS

| | | | | |
|---|---|---|---|---|
| 7,730,368 | B2* | 6/2010 | Murin et al. | 714/718 |
| 7,788,553 | B2* | 8/2010 | Chow et al. | 714/718 |
| 7,873,837 | B1* | 1/2011 | Lee et al. | 713/189 |
| 8,276,185 | B2* | 9/2012 | Messina et al. | 726/2 |
| 2003/0018939 | A1* | 1/2003 | Kinoshita et al. | 714/742 |
| 2003/0084307 | A1* | 5/2003 | Schwartz | 713/189 |
| 2004/0025027 | A1* | 2/2004 | Balard et al. | 713/183 |
| 2004/0071028 | A1* | 4/2004 | Messina et al. | 365/202 |
| 2005/0044222 | A1* | 2/2005 | Sekiya | 709/225 |
| 2005/0229065 | A1* | 10/2005 | Kai et al. | 714/742 |
| 2006/0059398 | A1* | 3/2006 | Chang et al. | 714/742 |
| 2006/0161725 | A1* | 7/2006 | Lee et al. | 711/103 |
| 2006/0282734 | A1* | 12/2006 | Milne et al. | 714/742 |
| 2007/0192828 | A1* | 8/2007 | Messina et al. | 726/2 |
| 2008/0147964 | A1* | 6/2008 | Chow et al. | 711/103 |
| 2008/0189557 | A1* | 8/2008 | Pipitone et al. | 713/193 |
| 2009/0125683 | A1* | 5/2009 | Okamoto et al. | 711/115 |
| 2009/0307411 | A1* | 12/2009 | GadelRab et al. | 711/103 |
| 2009/0307502 | A1* | 12/2009 | GadelRab et al. | 713/193 |
| 2010/0043078 | A1* | 2/2010 | Estakhri et al. | 726/27 |
| 2011/0068907 | A1* | 3/2011 | Ryoo et al. | 340/10.5 |
| 2013/0014215 | A1* | 1/2013 | Messina et al. | 726/2 |

* cited by examiner

PASSWORD PROTECTED BUILT-IN TEST MODE FOR MEMORIES

BACKGROUND

This relates to semiconductor memories.

Semiconductor memories, such as flash memories, may include a built-in test mode. The built-in test mode may be utilized by the manufacturer to conduct tests prior to distribution of the product. The built-in test mode may also be utilized subsequently, upon return of the part to the manufacturer, to analyze product failures.

Generally, the built-in test mode may be implemented by writing parameters to a test mode decoder to facilitate certain operative tests. These tests are generally run in what is called an engineering work station which has a receptacle for receiving the memories under test and for applying test parameters to those memories. The engineering work station also collects the results of the tests and provides the analysis of the results in order to determine whether the parts are operating correctly.

DETAILED DESCRIPTION

In accordance with some embodiments, a built-in test mode may be accessed after manufacture only through a password protected scheme. Basically, after manufacturing and delivery of the memory to the customer, the customer may program a password into the memory. That password controls access to the built-in test mode thereafter.

Then, when a product is returned to the manufacturer, the manufacturer can only access the built-in test mode if the manufacturer receives, from the customer, the password needed to access the built-in test mode.

Thus, upon purchasing the device, the customer can write a password which controls built-in test mode access thereafter. The manufacturer and all other users of the memory would have no idea what the password is and, therefore, could not access the built-in test mode.

It may be desirable to control access to the built-in test mode because security features of the memory might be bypassed through the built-in test mode. Nonetheless, it may still be desirable to enable use of the built-in test mode, upon password access, for example, to allow the manufacturer to analyze why parts were working improperly.

Embodiments may be utilized in a variety of semiconductor memories including volatile and non-volatile memories. For example, electrically erasable programmable read-only memories (EEPROMs), flash memories, including both NOR and NAND flash, phase change memories, dynamic random access memories, and static random access memories may be used, to mention a few examples.

Figure 1:
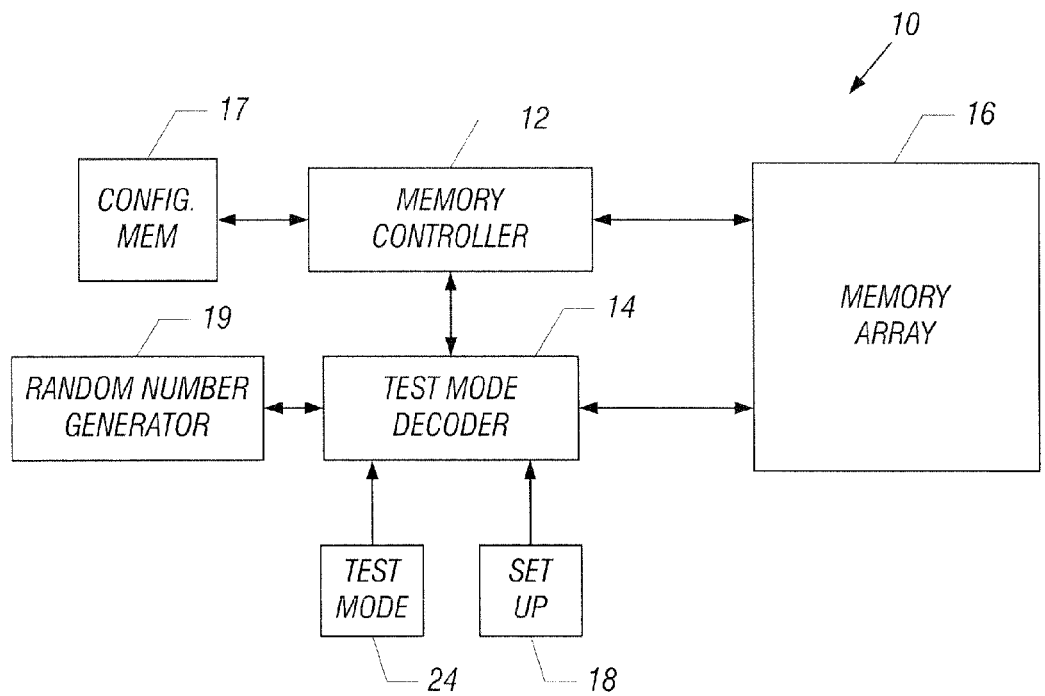
FIG. 1 is a schematic depiction of one embodiment of the present invention.

Referring to FIG. 1, an integrated semiconductor memory 10 may include a memory controller 12 coupled to a memory array 16. Conventionally, the memory array 16 may include rows and columns of cells that may be addressed in a variety of different fashions to either program information into the cell or to access information already programmed in the cell.

The memory array 16 may be accessed by a memory controller 12 which, in some embodiments, may be part of an integrated semiconductor memory 10. The memory controller 12 may also be accessed by test mode decoder 14. The test mode decoder 14 or test mode interface allows access to built-in test modes controlled by the memory controller 12. Alternatively, the test mode may be entered by forcing an internal signal to change from the normal operating mode. A configuration memory 17 that may be external to the array 16, may store information about the configuration of the memory 10. The memory 17 may be a non-volatile memory. A random number generator 19 may generate a random number used by the customer to encrypt a password.

In accordance with some embodiments, the configuration memory 17 may be programmed also with a special key, such as a double word password. The password programming can be checked by the device at power on to be sure that the device is correctly configured, that the password was written, and the test mode access configuration is also valid. This check may be necessary because after the integrated circuit is fabricated, the manufacturer cannot know the configuration of the device that might possibly be test mode password protected with an unknown password. If a complicated and longer key is also stored in a special part of the configuration memory 17, the probability of having a non-accessible device is very low.

Conventionally, the users of the memory 10 may access the built-in test mode by writing to registers of the configuration memory 17 (also called a POR sector). The configuration memory 17 stores configuration information for the memory. The configuration memory 17 may also store the information needed to access the built-in test mode after the password has been programmed.

The test mode decoder 14 may, in some embodiments, also store a test mode sequence 24 that implements the test mode and a test mode set up sequence 18. The sequences 18 and 24 may be software executed by a processor-based system such as the controller 12 or the decoder 14. Alternatively, the sequences may be implemented in hardware or firmware.

Figure 2:
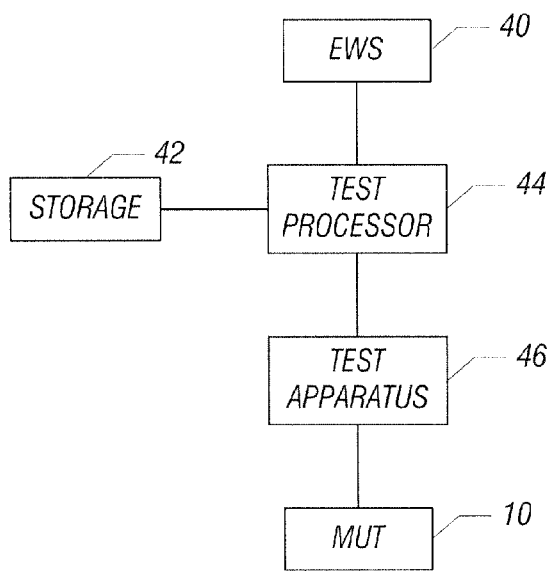
FIG. 2 is a test set up according to one embodiment.

Conventionally, the memory 10 may be coupled to a test apparatus 46 that applies test signals to the memory 10 under test (MUT), as shown in FIG. 2. The test apparatus 46 is coupled to a test processor 44 that includes storage 42. User access to the test processor 44 is gained through the engineering work station (EWS) 40 using an EWS flow to configure and test the memory from the fab.

Figure 3:
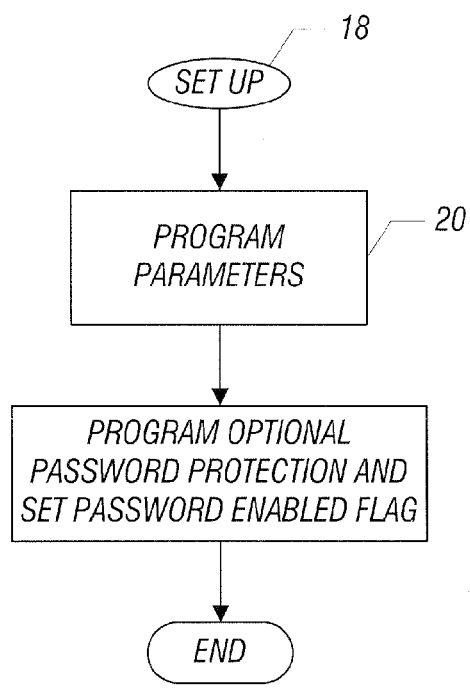
FIG. 3 is a flow chart for a set up flow in accordance with one embodiment of the present invention.

In the set up sequence 18, the various parameters to set up the configuration of the memory 10 may be programmed, as indicated in block 20 in FIG. 3. In addition, password protection may be enabled, for example, by writing a double word to the configuration memory 17. After programming the password, as indicated in block 22, a flag is set that thereafter results in the requirement for the provision of a password to use the test mode. Thus, in some embodiments, after the set up sequence 18 is implemented, if the flag is set, subsequent accesses to the test mode require provision of a password.

Figure 4:
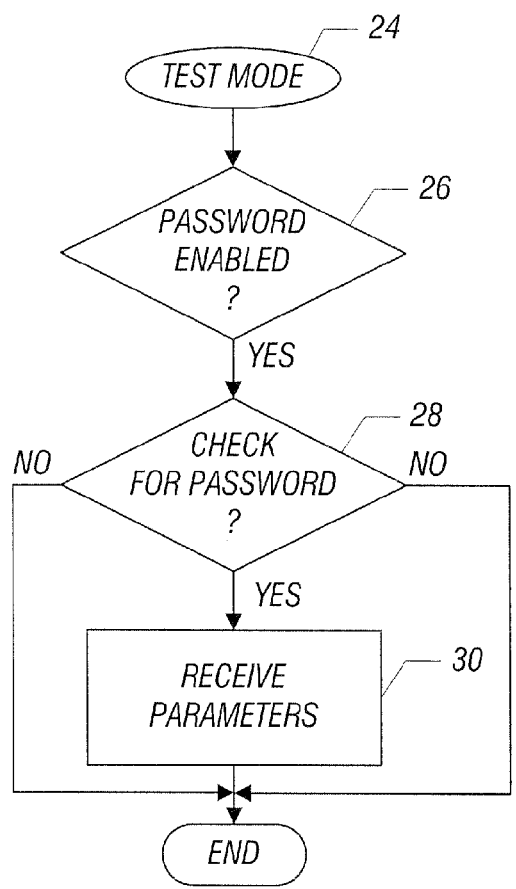
FIG. 4 is a flow chart for a built-in test mode in accordance with one embodiment of the present invention.

Then, to implement the test mode, a check at diamond 26 in FIG. 4 determines whether the flag has been set and the device is password enabled. If not, the flow continues normally. Otherwise, a check determines whether the correct password was entered, as indicated in block 28. In other words, the user password must be provided in order to access the test mode. If the password is not provided, no further progress of the flow may be allowed in some embodiments. If the password that is provided checks out when compared to the password stored in the configuration memory 17, then test mode access is allowed.

If the password is provided or the device is not password enabled, the various parameters to implement the test mode may then be received, as indicated in block 30. These parameters provide the tests that will be implemented and the data that is necessary to implement the tests, as is conventional in built-in test mode sequences.

In some embodiments, once the password has been provided, the memory 10 is thereafter no longer password protected. In other words, once the password is received, the password protection feature is effectively disabled. In some embodiments, a more elaborate encryption technique may be utilized. Basically, a random number may be used to further encrypt the password. A function may be defined that sets an encrypted code. The encrypted code is a function of a random number generated by the memory and the password established by the customer.

Then, when the manufacturer needs to access the device, the manufacturer obtains the random number from a random number generator on board the memory. The manufacturer then sends the random number to the customer. The customer forwards a password encypted with the random number. The manufacturer can then access to the test mode of the device using the encoded password. The manufacturer may, in some embodiments, reset the test mode protection and may not need the password thereafter.

Thus, in some cases, the customer may grant the manufacturer access to the test mode by giving a password to the manufacturer. The manufacturer, in some cases, may have to calculate an unlock key, which is a function of the password in a random number. In this way, the customer may keep the password secret by only giving the encrypted password. In other cases, if the password is the same for all of the customer's devices, the customer may use a random number generated by the device to encrypt the password. Where the password is different from device-to-device, it may not matter that the manufacturer gains access to the password and, therefore, the simpler technique may be utilized.

However, in other cases, it may be possible to reinstitute the password or to institute a new password upon provision of the existing password.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:
    an integrated semiconductor memory, comprising:
        a controller configured to control a built-in test mode;
        a memory array coupled to said controller;
        random number generator coupled to said controller and configured to provide a random number; and
        a test mode decoder coupled to said controller and said random number generator and configured to store a test mode sequence for implementing the built-in test mode and a test mode set-up sequence for configuring a password of the integrated semiconductor memory, said test mode decoder configured to implement a password protection access to said built-in test mode based on the password and the random number.

2. The apparatus of claim 1 wherein said password protected access is selectively implementable.

3. The apparatus of claim 1 wherein said integrated semiconductor memory is a flash memory.

4. The apparatus of claim 1, wherein the integrated semiconductor memory further comprises a configuration memory configured to store the password, said configuration memory external to said memory array.

5. An apparatus, comprising:
    an integrated semiconductor memory device comprising:
        a memory array;
        a random number generator configured to provide a random number;
        a test mode decoder coupled to the random number generator and configured to store a test mode sequence for implementing a built-in test mode and a test mode set-up sequence for configuring a password of the integrated semiconductor memory device, said test mode decoder configured to selectively implement a password protected access to said built-in test mode for said integrated semiconductor memory device using a code derived from the password and the random number.

6. The apparatus of claim 5, further comprising a configuration memory external from said array to store the password.

7. The apparatus of claim 5, further comprising a controller configured to control said built-in test mode.

8. The apparatus of claim 5, further comprising a memory controller coupled to said memory array.

9. The apparatus of claim 8, wherein said test mode decoder is included in said memory controller.

* * * * *